US006642284B2

(12) United States Patent
Thewes et al.

(10) Patent No.: US 6,642,284 B2
(45) Date of Patent: Nov. 4, 2003

(54) FLAME-RETARDANT COATING

(75) Inventors: Volker Thewes, Monheim (DE); Wolf-Dieter Pirig, Euskirchen (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/821,882

(22) Filed: Mar. 30, 2001

(65) Prior Publication Data

US 2001/0027226 A1 Oct. 4, 2001

(30) Foreign Application Priority Data

Mar. 30, 2000 (DE) .......................... 100 15 889

(51) Int. Cl.⁷ ................................. C08K 5/34
(52) U.S. Cl. .................. 521/146; 521/149; 521/170; 521/179; 524/100; 524/119; 524/386; 524/387; 524/494
(58) Field of Search ................ 521/179, 170, 521/146, 149; 524/100, 119, 386, 387, 494

(56) References Cited

U.S. PATENT DOCUMENTS

| 4,879,320 | A | 11/1989 | Hastings |
| 4,965,296 | A | 10/1990 | Hastings |
| 5,225,464 | A | 7/1993 | Hill, Jr. |
| 5,563,208 | A | 10/1996 | König et al. |
| 5,749,948 | A | 5/1998 | Scholz et al. |
| 6,054,513 | A | 4/2000 | Pirig et al. |
| 6,054,515 | A * | 4/2000 | Blount ................. 252/609 |
| 6,251,961 | B1 * | 6/2001 | Pirig et al. .............. 521/179 |
| 6,255,371 | B1 | 7/2001 | Schlosser et al. |

FOREIGN PATENT DOCUMENTS

| DE | 42 18 184 | 12/1993 |
| DE | 43 43 668 | 6/1995 |
| DE | 198 35 463 | 4/1999 |
| DE | 199 09 387 | 9/2000 |
| WO | WO 98/08898 | 3/1998 |
| WO | WO 98/45364 | 10/1998 |

OTHER PUBLICATIONS

German Search Report; Feb. 7, 2001.
U.S. patent application No. 09/517,486; filed Mar. 2, 2000.

* cited by examiner

Primary Examiner—John M. Cooney, Jr.
(74) Attorney, Agent, or Firm—Anthony A. Bisulca

(57) ABSTRACT

The invention relates to a flame-retardant coating which forms an insulating layer and is based on substances which carbonize and which form a foam layer in the event of a fire, on film-forming binders, on blowing agents and on customary auxiliaries and additives, wherein the blowing agent and foam layer forming substance present comprises melamine polyphosphate. The novel flame-retardant coating which forms an insulating layer is particularly stable under tropical conditions (at up to 100% rel. humidity, about 75° C.), i.e. it releases only an extremely small amount of $NH_3$.

11 Claims, No Drawings

FLAME-RETARDANT COATING

FIELD OF THE INVENTION

The invention relates to a flame-retardant coating which forms an insulating layer and is based on substances which carbonize and which form a foam layer in the event of a fire, on film-forming binders, on blowing agents and on customary auxiliaries and additives.

BACKGROUND OF THE INVENTION

Flame-retardant coatings which form an insulating layer, also called intumescent coatings, have the characteristic that they foam when exposed to the temperatures prevailing in the event of a fire, and this foaming of the abovementioned flame-retardant coating prevents, or at least hinders, the passage of heat to steel construction members, ceilings, walls, cables, pipes and the like.

U.S. Pat. No. 4,965,296 A1 describes a flame-retardant material composed of a flame-retardant coating material and of an electrically conductive material. This flame-retardant coating material is composed of substances which carbonize and which form foam, of a compound which produces gas, of a film-forming binder and of appropriate solvents. Customary other ingredients may be present if desired.

U.S. Pat. No. 4,879,320 describes a similar flame-retardant composition, but a ceramic fiber material has been added instead of a conductive material.

U.S. Pat. No. 5,225,464 describes an aqueous intumescence formulation based on a reaction product of phosphoric acid, melamine and monoammonium phosphate, which with pentaerythritol, with chlorinated hydrocarbons and with other compounds, in particular polyvinyl acetate, is intended to give an improved intumescence coating material.

DE 42 18 184 A1 describes an aqueous binder mixture composed of an aqueous solution and/or dispersion of a combination made from a) at least one NCO prepolymer which has urethane groups and blocked isocyanate groups and is soluble and/or dispersible in water in the presence of component b), and b) a polyamine component composed of at least one (cyclo)aliphatic polyamine having at least two primary and/or secondary amino groups.

Finally, DE 43 43 668 describes blowable flame-retardant coating compositions composed at least of
from 4 to 25% by weight of a film-forming binder,
from 10 to 4% by weight of ammonium polyphosphate,
from 8 to 40% by weight of at least one substance which carbonizes on exposure to heat,
from 6 to 25% by weight of a blowing agent,
from 0 to 5% by weight of dispersing agent, and
from 0 to 25% by weight of fillers.

A general disadvantage of the abovementioned flame-retardant coatings is that they contain halogen and/or have insufficient water resistance after drying.

The use of melamine as blowing agent is to be seen as particularly disadvantageous, since it reacts as a base in aqueous slurries. If, therefore, a flame-retardant coating which forms an insulating layer has a component which reacts as an acid in aqueous solution, the melamine is available as a reaction partner for this component. It is known that melamine and ammonium polyphosphate react in aqueous solution releasing ammonia ($NH_3$). At increased temperature and increased atmospheric humidity this reaction can also take place in a dried flame-retardant coating which forms an insulating layer, thus reducing the flame-retardant properties of the coating.

SUMMARY OF THE INVENTION

The object of the present invention is therefore to provide flame-retardant coatings which form an insulating layer and which, without using melamine or, respectively, ammonium polyphosphate are water-resistant after drying and also release only extremely small amounts of $NH_3$ at increased atmospheric humidity and increased temperature.

DESCRIPTION OF THE PREFERRED EMBODIMENTS

This object is achieved by a flame-retardant coating of the type described at the outset which forms an insulating layer, which comprises a melamine polyphosphate as blowing agent and as substance forming a foam layer.

The melamine polyphosphate preferably has the formula $(HMPO_3)_n$, where M is melamine and $n \geq 2$, in particular from 2 to 10 000.

Melamine polyphosphate is a polymer made from melamine units and phosphate units which have been linked to give relatively short or relatively long chains. The distribution of the melamine units and phosphate units may be regular or irregular, and they may, if desired, also have been polymerized within themselves. Derivatives of melamine, such as melem, melam and others, may also be present.

The properties of the melamine polyphosphate may vary within certain limits, due to its different chain lengths and to the distribution and/or frequency of the melamine units and phosphate units.

Melamine polyphosphate is described in more detail in PCT/WO 98/45364, for example, where it is also described as melamine salt of polyphosphoric acid.

The polymeric chain here is composed of $(HMPO_3)$ units [where M is melamine] and
$n \geq 2$, in particular from 5 to 10 000.

Melamine polyphosphate is usually obtained by heating melamine pyrophosphate under nitrogen at temperatures of 290° C. and above to constant weight (PCT/WO 98/08898).

The novel flame-retardant coating which forms an insulating layer is preferably free from ammonium polyphosphate.

The novel flame-retardant coating which forms an insulating layer is preferably free from melamine and/or dicyandiamides.

The flame-retardant coating which forms an insulating layer preferably comprises
from 5 to 30 parts by weight of film-forming binder,
from 5 to 25 parts by weight of a substance which carbonizes,
from 30 to 70 parts by weight of melamine polyphosphate, and
from 10 to 50 parts by weight of customary auxiliaries and additives.

The flame-retardant coating which forms an insulating layer particularly preferably comprises
from 10 to 20 parts by weight of film-forming binder,
from 7 to 15 parts by weight of a substance which carbonizes,
from 40 to 60 parts by weight of melamine polyphosphate, and
from 20 to 40 parts by weight of customary auxiliaries and additives.

The flame-retardant coating which forms an insulating layer preferably comprises as film-forming binders
homopolymers based on vinyl acetate, copolymers based on vinyl acetate, ethylene and vinyl chloride, copolymers based on vinyl acetate and the vinyl ester of a long-chain branched carboxylic acid, copolymers based on vinyl acetate and di-n-butyl maleate, copolymers based on vinyl acetate and acrylates, copolymers based on styrene and acrylates, and/or copolymers based on acrylates, vinyltoluene-acrylate copolymer, styrene-acrylate copolymer, vinyl-acrylate copolymer, self-crosslinking polyurethane dispersions.

The substances which carbonize and are present in the flame-retardant coating which forms an insulating layer preferably comprise carbohydrates. The carbohydrates used preferably comprise pentaerythritol, dipentaerythritol, tripentaerythritol and/or polycondensates of pentaerythritol.

The auxiliaries or additives present in the flame-retardant coating which forms an insulating layer preferably comprise glass fibers, mineral fibers, kaolin, talc, aluminum oxide, aluminum hydroxide, magnesium hydroxide, precipitation silicas, silicates and/or pulverized celluloses.

The novel flame-retardant coating which forms an insulating layer is preferably halogen-free.

The novel flame-retardant coating which forms an insulating layer releases less than 100 ppm of $NH_3$ when stored under high (atmospheric) moisture conditions (at up to 100% rel. humidity) and at increased temperature (about 75° C.).

The novel flame-retardant coating (intumescence coating) in the form of a spreadable, sprayable or rollable coating agent, is used in protecting a very wide variety of substrates, preferably steel, wood, electrical cables or pipes.

EXAMPLES

In the following examples, intumescence coatings were prepared and applied to standard steel sheets, and their effectiveness was determined. Insulation properties were tested to DIN 4102, Part 8 (1986). Water resistance was tested by storing the coated standard steel sheets at 40° C. and 95% atmospheric humidity in a conditioning cabinet for 4 weeks prior to the insulation property test.

To determine $NH_3$ release, the dried sample sheets are placed in a sealed glass system composed of a 500 ml glass flask and a glass lid with 2 faucets. To simulate atmospheric humidity (about 100% rel. humidity), the glass system has a glass trough with 10 ml of mains water. The glass system is placed in a circulating-air drying cabinet at 75° C. with one faucet closed. The second faucet is likewise closed after 10 minutes in the drying cabinet. The residence time of the flask in the drying cabinet from then on is 120 minutes. The flask is then removed from the drying cabinet and an adapter is used to provide one faucet with a Dräger tube. Nitrogen is supplied to the second faucet at a rate of 5l per hour. The flask is flushed for 30 minutes and the amount of ammonia released is read off directly from the Dräger tube.

The products used in the examples were as follows:
®Pliolite (solid) (Goodyear, France)

This is a newtonian thermoplastic resin based on vinyltoluene-acrylate copolymers.

®Exolit AP 462 (Clariant GmbH, Frankfurt am Main, Germany)

This is a microencapsulated ammonium polyphosphate based on ®Exolit AP 422 prepared by the process of EP-B-0 180 795 and comprising about 10% by weight of capsule material composed of a cured melamine-formaldehyde resin.

®Exolit AP 422 (Clariant GmbH, Frankfurt am Main, Germany) is a free-flowing, pulverulent, low-water-solubility ammonium polyphosphate of the formula $(NH_4PO_3)$ with n=from 20 to 1000, in particular from 500 to 1000. The proportion of particles with a particle size less than 45 µm is more than 99%.

Example 1

Comparative

The following substances were mixed in succession and then applied appropriately to the sheet for testing:

38 parts by weight of ®Hostaflam AP 462

10 parts by weight of ®Pliolite (solid)

8 parts by weight of melamine 8 parts by weight of dipentaerythritol 8 parts by weight of titanium dioxide and to 100 parts by weight of thickener, plasticizer and solvent.

The fire test to DIN 4102 on the coated sheet gave the fire classification F 30. The fire classification was likewise F 30 after the period of storage in the conditioning cabinet.

$NH_3$ release was measured as 4625 ppm of $NH_3$.

Example 2

Inventive

The following substances were mixed in succession and then applied appropriately to the sheet for testing:

9 parts by weight of ®Pliolite (solid)

52 parts by weight of melamine polyphosphate 7 parts by weight of dipentaerythritol 7 parts by weight of titanium dioxide and to 100 parts by weight of thickener, plasticizer and solvent.

The fire test to DIN 4102 on the coated sheet gave the fire classification F 30. The fire classification was likewise F 30 after the period of storage in the conditioning cabinet.

$NH_3$ release was measured as 35 ppm of $NH_3$.

Example 3

Comparative

The following substances were mixed in succession and then applied appropriately to the sheet for testing:

30 parts by weight of ®Hostaflam AP 422

22 parts by weight of polyvinyl acetate copolymer (50% strength)

19 parts by weight of melamine 13 parts by weight of pentaerythritol 5 parts by weight of titanium dioxide and to 100 parts by weight of thickener, fillers, water, dispersing agent and preservatives.

The fire test to DIN 4102 on the coated sheet gave the fire classification F 30. The fire classification F 30 was no longer achieved after the period of storage in the conditioning cabinet.

$NH_3$ release was measured as 5200 ppm of $NH_3$.

Example 4

Inventive

The following substances were mixed in succession and then applied appropriately to the sheet for testing:

20 parts by weight of polyvinyl acetate copolymer (50% strength)

55 parts by weight of melamine polyphosphate 11 parts by weight of pentaerythritol 4 parts by weight of titanium dioxide and to 100 parts by weight of thickener, fillers, water, dispersing agent and preservatives.

The fire test to DIN 4102 on the coated sheet gave the fire classification F 30. The fire classification was F 30 after the period of storage in the conditioning cabinet.

$NH_3$ release was measured as 50 ppm of $NH_3$.

Example 5

Comparative

The following substances were mixed in succession and then applied appropriately to the sheet for testing:

30 parts by weight of ®Exolit AP 422

22 parts by weight of aliphatic urethane/acrylic hybrid dispersion (30% strength)

17 parts by weight of melamine 12 parts by weight of dipentaerythritol 5 parts by weight of titanium dioxide and to 100 parts by weight of thickener, fillers, water, dispersing agent and preservatives.

The fire test to DIN 4102 on the coated sheet gave the fire classification F 60. The fire classification was still F 30 after the period of storage in the conditioning cabinet.

$NH_3$ release was measured as 4850 ppm of $NH_3$.

Example 6

Inventive

The following substances were mixed in succession and then applied appropriately to the sheet for testing:

19 parts by weight of aliphatic urethane/acrylic hybrid dispersion (30% strength)

53 parts by weight of melamine polyphosphate 10 parts by weight of dipentaerythritol 4 parts by weight of titanium dioxide and to 100 parts by weight of thickener, fillers, water, dispersing agent and preservatives.

The fire test to DIN 4102 on the coated sheet gave the fire classification F 60. The fire classification was F 60 after the period of storage in the conditioning cabinet.

$NH_3$ release was measured as 40 ppm of $NH_3$.

As apparent from the examples, the use of melamine polyphosphate can reduce $NH_3$ release by a factor of at least 100 when compared with melamine.

What is claim is:

1. An intumescent coating which forms an insulating layer and is based on substances which carbonize and which form a foam layer in the event of a fire, on film-forming binders, on blowing agents and on auxiliaries and additives, which comprises a blowing agent and a substance forming a foam layer, wherein the blowing agent and the substance forming a foam layer is melamine polyphosphate, and wherein no ammonium polyphosphate is present.

2. An intumescent coating which forms an insulating layer, as claimed in claim 1, wherein the melamine polyphosphate has the formula $(HMPO_3)_n$, where M is melamine and $n \geq 2$, in particular from 2 to 10 000.

3. An intumescent coating which forms an insulating layer, as claimed in claim 1, wherein no melamine and/or dicyandiamides are present.

4. An intumescent coating which forms an insulating layer as claimed in claim 1, which comprises from 5 to 30 parts by weight of film-forming binder, from 5 to 25 parts by weight of a substance which carbonizes, from 30 to 70 parts by weight of melamine polyphosphate, and from 10 to 50 parts by weight of auxiliaries and additives.

5. An intumescent coating which forms an insulating layer as claimed in claim 1, which comprises from 10 to 20 parts by weight of film-forming binder, from 7 to 15 parts by weight of a substance which carbonizes, from 40 to 60 pads by weight of melamine polyphosphate, and from 20 to 40 parts by weight of auxiliaries and additives.

6. An intumescent coating which forms an insulating layer as claimed in claim 1, wherein the film-forming binders are selected from the group consisting of:

homopolymers based on vinyl acetate, copolymers based on vinyl acetate, ethylene and vinyl chloride, copolymers based on vinyl acetate and the vinyl ester of a long-chain branched carboxylic acid, copolymers based on vinyl acetate and di-n-butyl maleate, copolymers based on vinyl acetate and acrylates, copolymers based on styrene and acrylates, and/or copolymers based on acrylates, vinyltoluene-acrylol copolymer, styrene-acrylate polymers, vinyl-acrylate copolymers, and self crosslinking polyurethane dispersions.

7. An intumescent coating which forms an insulating layer as claimed in claim 1, wherein the substances present which carbonize comprise carbohydrates.

8. An intumescent coating which forms an insulating layer as claimed in claim 7, wherein the carbohydrates used are selected from the group consisting of: pentaerythritol, dipentaerythritol, tripentaerythritol and poly-condensates of pentaerythritol.

9. An intumescent coating which forms an insulating layer as claimed in claim 1, wherein the auxiliaries or additives present are selected from the group consisting of class fibers, mineral fibers, kaolin, talc, aluminum oxide, aluminum hydroxide, magnesium hydroxide, precipitation silicas, silicates and pulverulent celluloses.

10. An intumescent coating which forms an insulating layer as claimed in claim 1, which is halogen-free.

11. An intumescent coating which forms an insulating layer as claimed in claim 1, which releases less than 100 ppm of $NH_3$ when stored under high-moisture conditions at up to 100% rel. humidity, and at increased temperature (about 75° C.).

* * * * *